C. C. NEALE.
AUTOMATIC LOCK MECHANISM FOR DUMPING SCALES.
APPLICATION FILED NOV. 18, 1920.
1,392,075.
Patented Sept. 27, 1921.
2 SHEETS—SHEET 2.
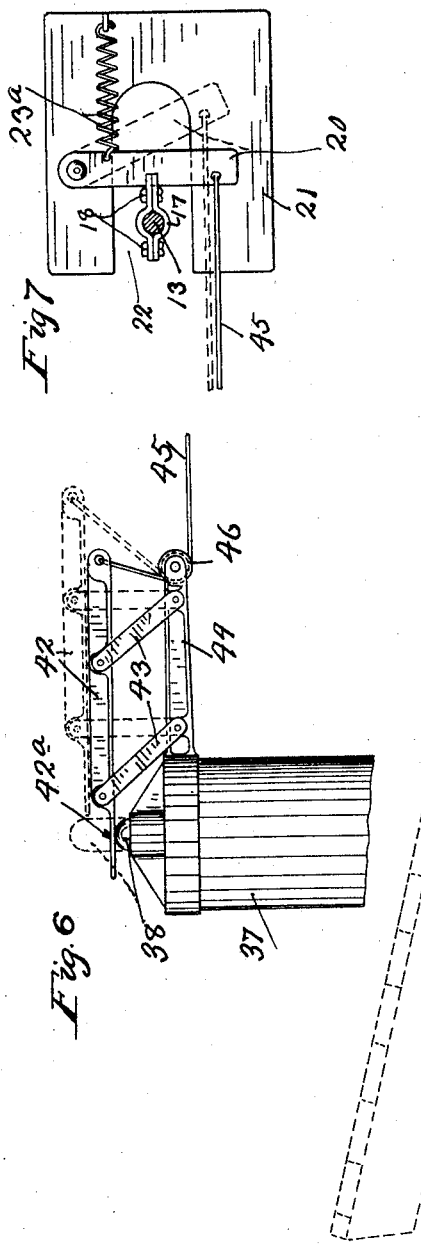
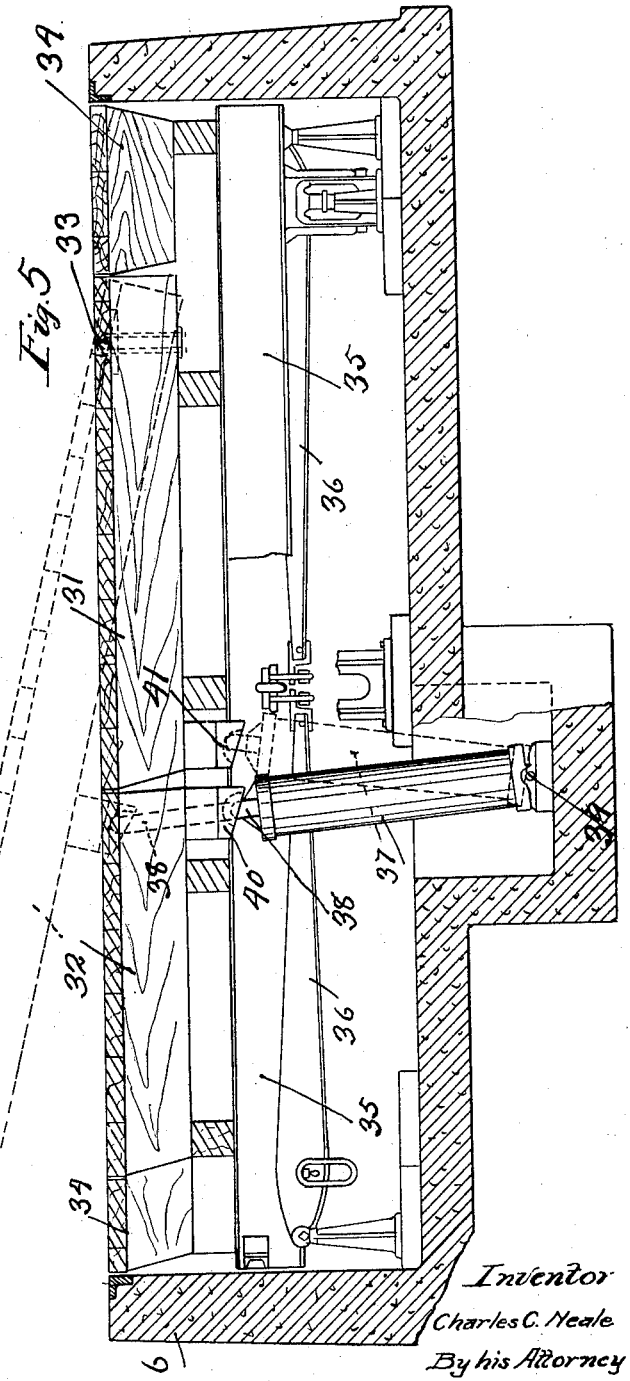
Inventor
Charles C. Neale
By his Attorney

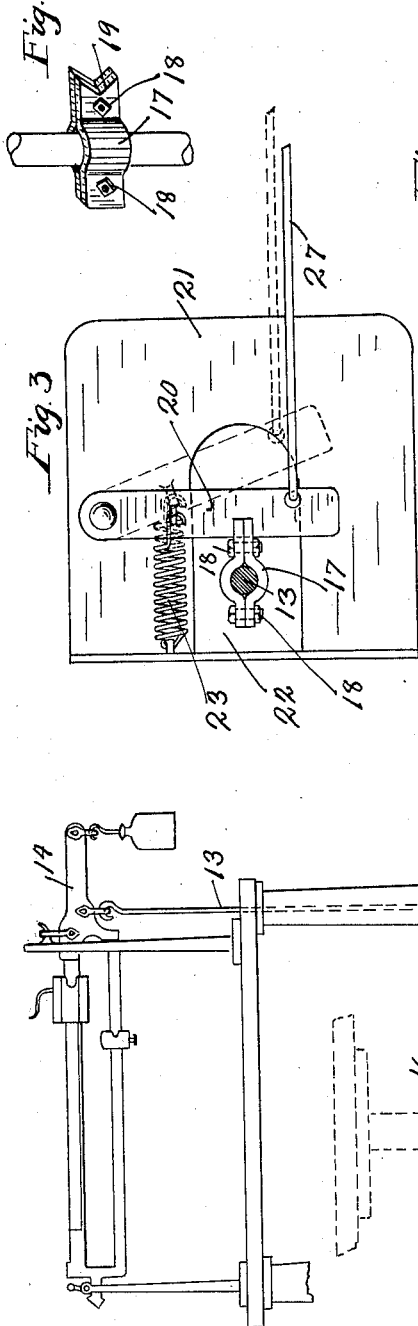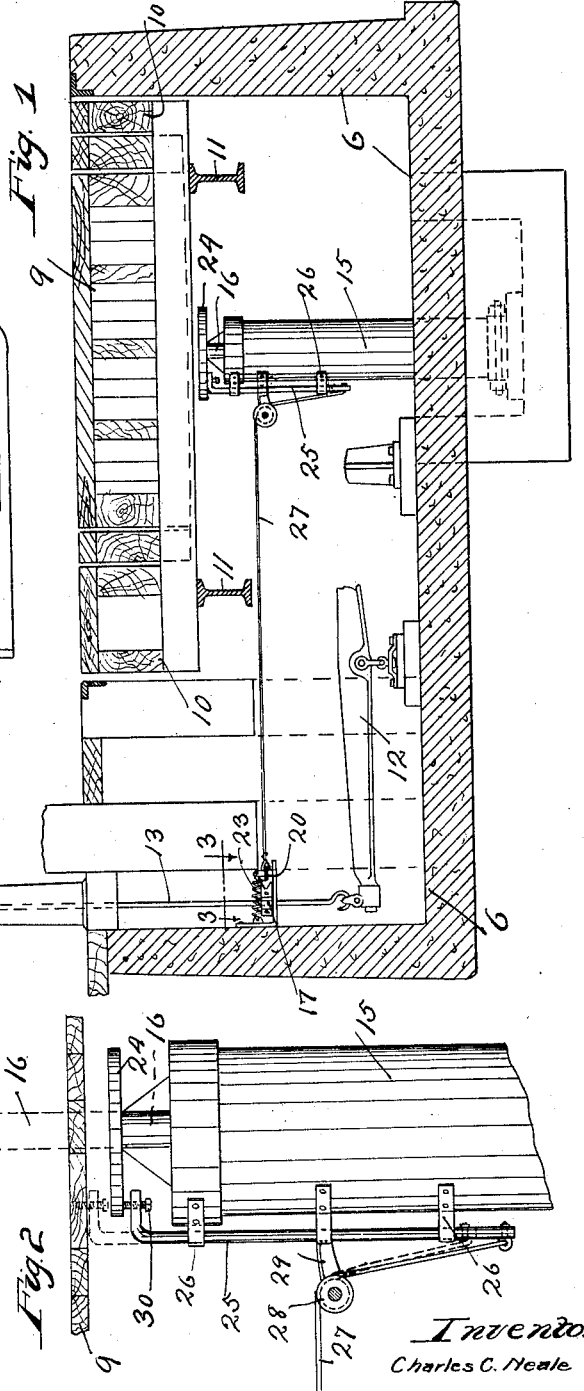

UNITED STATES PATENT OFFICE.

CHARLES C. NEALE, OF MINNEAPOLIS, MINNESOTA, ASSIGNOR TO GLOBE MACHINERY & SUPPLY COMPANY, OF DES MOINES, IOWA, A CORPORATION OF IOWA.

AUTOMATIC LOCK MECHANISM FOR DUMPING-SCALES.

1,392,075.          Specification of Letters Patent.      Patented Sept. 27, 1921.

Application filed November 18, 1920. Serial No. 424,840.

*To all whom it may concern:*

Be it known that I, CHARLES C. NEALE, am a citizen of the United States, residing at Minneapolis, in the county of Hennepin and State of Minnesota, have invented certain new and useful Improvements in Automatic Lock Mechanism for Dumping Scales; and I do hereby declare the following to be a full, clear, and exact description of the invention, such as will enable others skilled in the art to which it appertains to make and use the same.

My invention relates to that type of platform scales that have tilting or dumping platforms arranged to be raised and lowered by underground power mechanism usually including a cylinder and a piston.

In this type of scale mechanism, it has been found, in practice, that frequently the platform-lifting piston will not properly return to its normal or extreme retracted position, or will be accidentally moved by leakage of steam or air, from its normal position and into a position in which it will exert more or less lifting pressure on the platform and, hence, will interfere with the proper weighing action by producing or causing a weight indication that will be less than that of the actual load on the scale platform.

My invention is directed particularly to an automatic lock mechanism, which will lock the scale mechanism and prevent any weight indication from being produced thereby whenever the piston or movable element of the power mechanism is moved from normal position.

The invention is illustrated in the accompanying drawings, wherein like characters indicate like parts throughout the several views.

Referring to the drawings:

Figure 1 is a view partly in transverse section and partly in elevation illustrating my invention applied to lock the scale mechanism of a platform scale that is provided with a vertically movable platform section adapted to lift the front wheels of a vehicle, the load from which is adapted to be dumped;

Fig. 2 is a fragmentary view showing the upper end of the cylinder and piston and illustrating one way of applying the scale locking mechanism thereto;

Fig. 3 is a horizontal section on the line 3—3 of Fig. 1, showing certain parts on an enlarged scale;

Fig. 4 is a fragmentary perspective showing the preferred form of the lock element on the main scale rod;

Fig. 5 is a longitudinal section showing a platform scale having a two-section tilting platform arranged to be raised by a cylinder and piston in a well known manner;

Fig. 6 is a side elevation showing the upper portion of the cylinder and piston illustrated in Fig. 5 and illustrating a modified way of applying the lock mechanism thereto; and Fig. 7 is a view corresponding to Fig. 3, but illustrating a slightly modified arrangement from that shown in Fig. 3.

Referring first to the arrangement illustrated in Figs. 1 to 4, inclusive, the numeral 6 indicates an underground scale pit, of the usual construction, preferably having concrete walls and floor. The numeral 9 indicates a vertically movable platform section mounted to move vertically through an opening in a main scale platform 10 shown as supported on platform beams 11.

The numeral 12 indicates one of the lower scale levers fulcrumed within the pit 8 and connected to the scale platform 10 through the customary levers and coöperating connections, not illustrated.

One end of the scale lever 12 is connected by a main scale rod 13 to the usual graduated poise-equipped upper scale lever 14.

The scale mechanism, *per se*, constitutes no part of the present invention, and in so far as it is shown, is for illustrated purposes and may be of any well known or suitable construction or type.

The tilting of a vehicle to dump its load, with the scale platform illustrated, will be produced by lifting the front wheels while on the vertically movable platform section 9; and the lifting of this platform section 9 is here adapted to be produced by an upright cylinder 15 anchored within the pit 8 and provided with a piston 16, the upper end of which is adapted to press against the bottom of said platform section 9.

With this arrangement, it is evident that if, by leakage of air for example into the cylinder 15, the piston 16 should be slightly raised from its lower normal or extreme retracted position, it will produce an upward pressure on the platform section 9 that would destroy or interfere with the proper weighing action of the scale. For example, if the upward pressure then produced on the platform section 9 should be one hundred pounds, then the scale would give a weight indication one hundred pounds under the actual weight of the load on the scale platform. To prevent this action or similar inaccuracies, my improved automatic scale locking mechanism has been devised.

Attention is first directed to the automatic lock mechanism shown in Figs. 1 to 4, inclusive. The lock mechanism proper comprises a lock element on the scale rod 13 and a coöperating spring-pressed lock blade. The first noted lock element, as shown in this arrangement, is afforded by a two-part clamp 17 rigidly but adjustably clamped to the rod 13, by nut-equipped bolts 18, and provided at one end with a V-shaped notch 19. The lock blade 20, at one end, is pivoted to a supporting bracket 21 rigidly secured to one of the walls of the pit 8 and provided with a large opening 22, through which the rod 13 and clamp 17 freely pass. A spring 23, anchored to the bracket 21 and attached to the blade 20, tends to hold said blade engaged with the notch 19; and when said blade is engaged with said notch, the scale mechanism will be locked and the scale beam 14 will then be positively held in a centered or neutral position, so that no weight indications can then be given.

As a convenient way of automatically moving the lock blade 20 into a releasing position when and only when the piston 16 is in its normal lowered or extreme retracted position, the upper end of the pistons 16 is provided with a disk-like head 24 that is operative on the upper end of a rod 25 that is mounted to slide vertically in suitable guides 26 on the fixed cylinder 15. The lower end of this sliding rod 25 is connected by a releasing cable 27, to the free end of the lock blade 20. The cable 27, as shown, runs over a guide shieve 28 journaled to a bracket 29 rigid on the cylinder 15. To provide for adjustments in the connections just described, the upper end of the rod 25 is provided with a contact screw 30, with which the disk-like head 24 is directly engageable.

The operation of the automatic lock just described is probably obvious from the foregoing statements, but may be briefly summarized as follows:

When the piston is in its normal position, that is, in its extreme lowered or retracted position, the disk-like head 24 thereof, by engagement with the screw 30, will press the rod 25 downward and cause the cable 27 to pull the lock blade 20, against the tension of the spring 23, into its retracted or releasing position, shown by dotted lines in Fig. 3, thereby leaving the scale mechanism free to operate. Under these conditions, of course, it is known and certain that the lifting motor, made up of the cylinder and piston, does not, in any way, interfere with the proper and accurate operation of the scale mechanism.

Whenever the piston 16 is raised slightly or to its extreme position or to any intermediate position, either by accident or design, the disk-like head 24 will move out of action on the rod 25, thereby releasing the lock blade 20 and permitting the same, by the spring 23, to be moved into its operative or locking position in engagement with the notch 19 of the bracket 17, thereby locking the scale mechanism and holding the scale beam 14 in a centered and temporarily fixed neutral position, so that no weight indication whatever can be given. Thus, it will be seen that the scale mechanism is automatically locked at all times except when the lifting piston is in an extreme retracted position or in a position in which it does not and cannot, in any way, interfere with the proper weighing action of the scale.

Directing attention now to Figs. 5, 6 and 7, it will first be noted that there a two-part tilting or dumping platform is illustrated. This platform comprises two sections 31 and 32, both of which are pivoted at 33 in a well known manner, the construction being such that a short section 31 can be moved independently of the long section 32, but said short section will move whenever the long section is moved on the common pivot 33. The pivotal connection 33 is made to a scale platform 34, into which the sections 31 and 32 are seated flush when lowered. The scale platform 34 is supported by the customary scale mechanism, which includes beams 35 and levers 36.

For lifting the platform sections, there is a cylinder 37 and coöperating piston 38 of well known arrangement. The cylinder 37 is mounted on a pivot 39, so that the projecting end of the piston rod or stem may be engaged, at will, either with a socket 40 on the platform section 32 or with the socket 41 on the platform section 31.

In this arrangement, the steelyard rod 13 is provided with the clamp 17, with the V-shaped notch 19, as in the earlier described arrangement. Also, for coöperation with said notch 19, the lock blade 20, pivoted to the bracket 21, as before described, is also provided; but in this arrangement, the coiled spring 23ª, which is anchored to said bracket and connected to said lock blade, tends to move said blade into an inoperative position, in this respect acting reversely to the action of the spring 23 in the arrangement first described.

For the application of the automatic lock mechanism where the piston rod projects from the cylinder head but slightly when the piston head is in its lowermost or retracted position, I provide a lock-actuating device, as best shown in Fig. 6. This device comprises a bar 42 pivotally carried by the upper ends of a pair of parallel links 43, which, as shown, are pivotally attached at their lower ends to an arm 44 projected from the upper head of the cylinder 37. One end of the bar 42 is preferably flattened at 42$^a$ and normally rests on the upper end of the lowered piston rod, as indicated by full lines in Fig. 6. The other end of the bar 42 is connected by a cable 45 to the free end of the lock blade or bar 20, as shown in Fig 7. In this arrangement, the spring 23$^a$ tends to normally hold the lock blade 20 in its releasing position indicated by dotted lines in Fig. 7, and acting through the cable 45, at this time, tends to hold the bar 42 in the position indicated by full lines in Fig. 6. However, the bar 42 can be in the position shown by full lines in Fig. 6 only when the piston is in its extreme lowered position or retracted position, and at which time, the piston cannot interfere with the proper scale operation. Whenever the piston is raised by accident or design, even slightly, the bar 42 will be moved to its dotted line position in Fig. 6, and thereby acting through the cable 45, will positively move the lock blade 20 into engagement with the notch 19 of the clamp 17, as shown by full lines in Fig. 7, thereby locking the scale mechanism so that no weight indication can be given even though there may be a load on the scale platform.

Obviously, either of the devices described will accomplish the general object of this invention set forth in the introductory paragraphs of this specification; and from what has already been said, it will be obvious that various other arrangements or modified devices may be devised and used for the same general purposes, without departing from the spirit of the invention herein broadly disclosed and broadly claimed.

As is obvious, the scale locking mechanism, in a broad sense, is a scale interrupting device which, when thrown into action, prevents the scale from giving weight indications.

What I claim is:

1. The combination with a scale platform having a movable section and a power device normally out of action for moving said section, of a lock operative to lock the scale mechanism and means whereby said lock is automatically brought into action at all times when said power device is caused to act on said movable platform section.

2. The combination with a scale platform having a movable section and a power device normally out of action for moving said section, a scale interrupting device operative to prevent the scale mechanism from giving weight indications, and means whereby said interrupting device is automatically brought into action when said power device is caused to act on said movable platform section.

3. The combination with a scale platform having a movable section and a power device normally out of action for moving said section, of means automatically controlled by the power device when brought into action to prevent the scale mechanism from giving weight indications, said means comprising a lock element secured for movement with one of the scale elements, and a coöperating lock blade.

4. The combination with a scale platform having a movable section and a power device normally out of action for moving said section, of means automatically controlled by the power device when brought into action to prevent the scale mechanism from giving weight indications, said means comprising a lock element secured for movement with one of the scale elements, and a coöperating lock blade, one of said lock elements having a V-shaped notch with which the other lock element is engageable.

5. The combination with a scale platform having a movable section, of a cylinder and piston motor for lifting said platform section, scale mechanism coöperating with said platform, a lock for said scale mechanism, and lock-actuating mechanism operated by the motor piston and operative to release the lock and permit the normal scale operation when and only when said piston is in its extreme retracted position and is inoperative on said movable platform section.

In testimony whereof I affix my signature.

CHARLES C. NEALE.